H. C. RASSMANN.
WATERING DEVICE FOR CATTLE.
APPLICATION FILED APR. 29, 1918.
1,384,346.
Patented July 12, 1921.
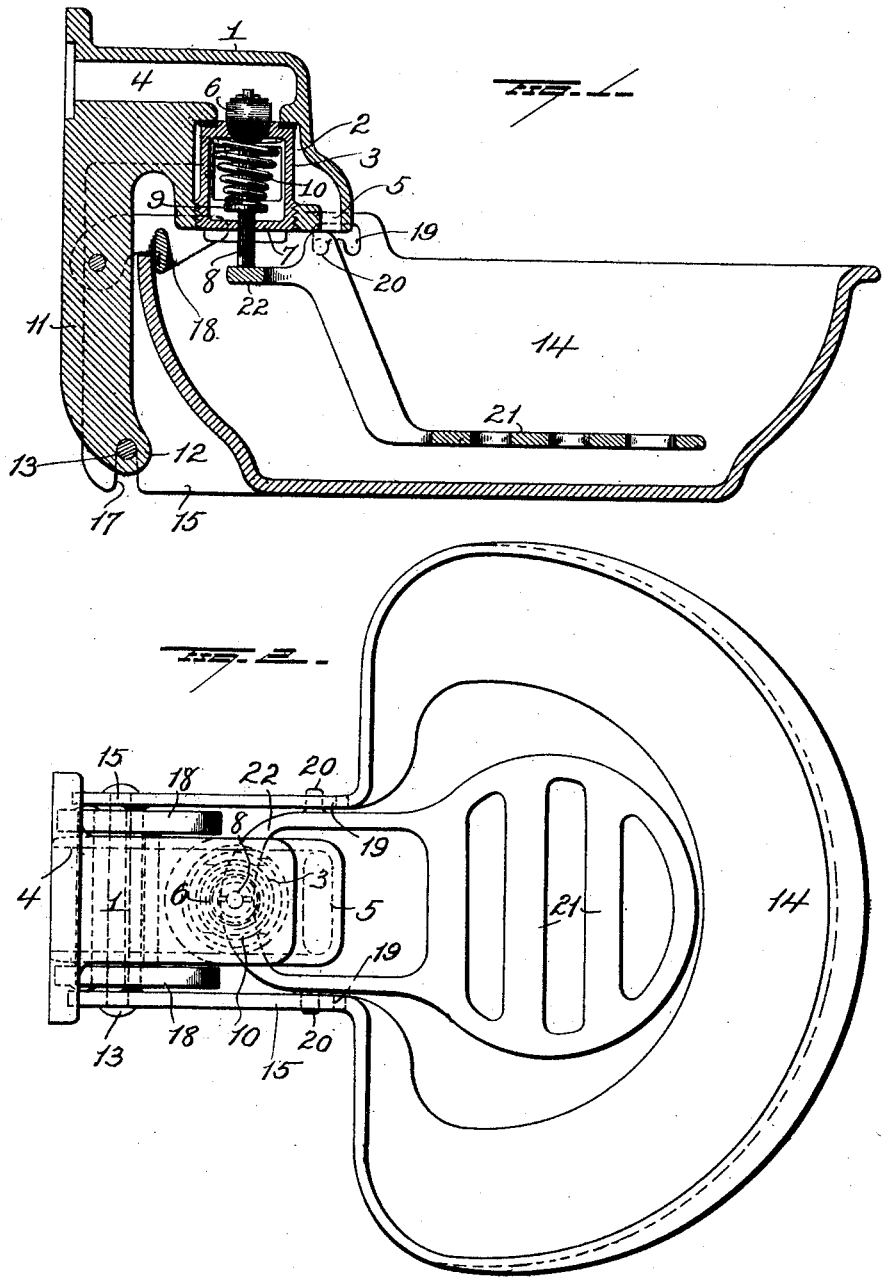

UNITED STATES PATENT OFFICE.

HUGO C. RASSMANN, OF BEAVER DAM, WISCONSIN.

WATERING DEVICE FOR CATTLE.

1,384,346. Specification of Letters Patent. Patented July 12, 1921.

Application filed April 29, 1918. Serial No. 231,464.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle,—one object of the invention being to so construct the valved fount that the force of the flow of water shall be broken before being discharged into the bowl, and so that a supply connection to the fount can be readily drained.

A further object is to provide animal-operated means mounted in the bowl for controlling the valve of the fount, and to so mount said animal-operated means that the same can be readily moved out of operative relation to the valve of the valved fount.

With these and other objects in view, the invention consists in certain novel features of construction and combinations of parts as hereinafter set forth and pointed out in the claims.

In the accompanying drawings, Figure 1 is a sectional view of a watering device showing an embodiment of my invention, and Fig. 2 is a plan view.

1 represents a fount having a chamber 2 therein for the accommodation of a valve cage 3,—said fount being also provided with a duct or supply passage 4 adapted at one end for the reception of a suitable supply pipe (not shown) and adapted at its other end for communication with the valve cage 3, and said fount is also formed with a discharge spout 5 communicating with the side of the valve cage. This spout will discharge water into a drinking bowl as hereinafter explained and it will be seen that by causing the supply of water to enter the top of the valve cage and then flow laterally to the spout, the force of the water will be broken and prevented from flowing with too great speed into the bowl.

The top of the valve cage 3 is provided with a seat for a valve 6, the stem of this valve passing downwardly through the cage and through the bottom 7 of the latter, terminating an appreciable distance below said bottom. Intermediate of its ends, within the cage 3, the valve stem 8 is provided with a collar 9 which forms a bearing for one end of a coil spring 10,—the other end of said spring bearing against the top portion of the cage and serving normally to retain the valve 6 on its seat.

The fount 1 is provided with a depending arm or bracket 11, the lower end of which may be formed with a toe 12 with which a pivot pin 13 is connected so as to project laterally in opposite directions therefrom. This pin serves as a pivotal support or hinge pin for a bowl 14,—said bowl being provided at one end with parallel extensions 15 which partially embrace the arm or bracket 11 and are suitably perforated to receive the ends of the pivot pin 13. The perforations which receive said pivot pin are preferably made in the form of elongated slots 17 made in the lower portions of the extensions 15 and open at their lower ends so that the bowl may be lifted off the pin 13 to remove it from its support.

The bowl 14 is retained in a normal horizontal position by means of a latch 18, which, in the present instance, is made in the form of a double hook suitably braced and pivotally attached to the depending arm or bracket 11 so that it will engage the rear end portion of the bowl in the manner clearly shown in Fig. 1.

The side walls of the rear portion of the bowl are provided with inverted U-shaped slots 19 and in the depending portions of these slots nearest the fount, the pivot pins 20 of an animal-operated platform lever 21 are mounted,—the platform portion of this lever being normally disposed a comparatively short distance above the bottom of the bowl. The platform lever is provided near its pivoted upper end with a rearwardly projecting arm or finger 22, the end portion of which is normally disposed under the downwardly projecting end of the valve stem 8. It is apparent that when an animal depresses the platform lever the valve 6 will be raised from its seat and water will be permitted to flow into the bowl. As soon as pressure shall have been removed from the platform lever, the valve 6 will be promptly returned to its seat and the platform lever caused to assume its normal position, by the action of the spring 10.

It is sometimes desirable to so adjust the animal-operated means that the same cannot be manipulated to open the valve. To accomplish this, it is simply necessary to raise said lever slightly and move its pivot pin from one end of the slots 19 to the depending portion at the other ends of said slots, thus moving the arm 22 of the platform lever out of line with the depending end of the valve stem.

Slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent is:

1. In a watering device, the combination of a valved fount, a bowl, one of said parts having separated mountings for a lever, an animal-operated lever coöperable with the valve of the valved fount, and means for pivotally supporting said animal-operated lever at either of said separated mountings, whereby said lever may be supported in the bowl in operative relation to the valve of the valved fount or out of operative relation to said valve.

2. In a watering device, the combination with a fount, a valve therefor, and a bowl to receive water from the fount, of an animal operated lever provided with a valve-operating part normally disposed in operative relation to said valve, said lever provided with pintles, and the bowl provided with separated mountings for said pintles, whereby the lever may be supported in the bowl in operative relation to the valve or out of operative relation to said valve.

3. In a watering device, the combination with a fount and a bowl supported under the same, said fount having a horizontal supply duct in its upper portion, a discharge spout at its lower portion and a valve chamber intermediate of said supply duct and discharge spout and laterally removed from the latter, of a valve cage in said valve chamber provided at its upper end with a valve seat and closed at its lower end, a valve closing downwardly on said seat, a stem for said valve projecting through the closed lower end of the valve cage and depending below the same, a spring for seating said valve, and an animal-operated lever in the bowl and coöperable with said valve stem.

4. In a watering device, the combination with a valved fount having its valve stem depending below the same, of a bowl mounted under the fount and provided in its side walls with slots having depending portions at their ends, and an animal-operated lever pivotally mounted normally in the depending portions at one end of the respective slots and having an arm normally disposed under the depending valve stem of the valve fount, said lever being adapted to be moved so that it will be mounted in the depending portions of the other ends of said slots and hold said lever out of operative relation to the valve stem.

In testimony whereof I have signed this specification in the presence of two subscribing witnesses.

HUGO C. RASSMANN.

Witnesses:
H. R. RITTER,
A. B. CHANDLER.